United States Patent [19]

Billet et al.

[11] Patent Number: 4,556,399
[45] Date of Patent: Dec. 3, 1985

[54] PROTECTIVE BELLOWS, PARTICULARLY FOR THE FRONT WHEEL DRIVE OF A MOTOR VEHICLE

[75] Inventors: Maurice Billet, Thouare; Serge Lallement, La Chapelle sur Erdre, both of France

[73] Assignee: Compagnie des Produits Industriels de l'Ouest, Nantes, France

[21] Appl. No.: 562,077

[22] Filed: Dec. 16, 1983

[30] Foreign Application Priority Data

Dec. 16, 1982 [FR] France .................................. 82 21118

[51] Int. Cl.⁴ .............................................. F16D 3/84
[52] U.S. Cl. .............................. 464/175; 277/212 FB
[58] Field of Search ................ 277/212 FB; 464/173, 464/175, 905, 906

[56] References Cited

U.S. PATENT DOCUMENTS

| | | | |
|---|---|---|---|
| 2,467,902 | 4/1949 | McPhee | 464/175 X |
| 2,702,996 | 3/1955 | Davis | 464/175 X |
| 2,825,213 | 3/1958 | Dunn | 464/175 X |
| 3,511,061 | 5/1970 | Burckhardt | 464/175 |
| 3,520,152 | 7/1970 | Schmid | 464/175 X |
| 4,205,539 | 6/1980 | Orain | 464/905 X |
| 4,338,796 | 7/1982 | Orain | 464/905 X |

FOREIGN PATENT DOCUMENTS 2346837  4/1975  Fed. Rep. of Germany ...... 464/175

Primary Examiner—Stuart S. Levy
Assistant Examiner—Daniel P. Stodola
Attorney, Agent, or Firm—Oblon, Fisher, Spivak, McClelland & Maier

[57] ABSTRACT

A bellows having, at one of an end thereof a small fold intended to provide a complement of the volume of the bellows at the large angular clearances of the drive shaft, to one of which the bellows is connected by a sleeve with a small diameter. The small fold works with an intermediate fold and a large fold by the interposition of a first cylindrical zone that flares out toward the intermediate fold along a radius of curvature. The large fold is fastened on the second element of the drive of greater diameter by via a second cylindrical zone.

9 Claims, 16 Drawing Figures

PROTECTIVE BELLOWS, PARTICULARLY FOR THE FRONT WHEEL DRIVE OF A MOTOR VEHICLE

BACKGROUND OF THE INVENTION

1. Field of the Invention

This invention relates to a protective bellows with reduced volume for hinged joints, particularly for the front wheel drive of a motor vehicle. More particularly, it relates to a rubber protective element for tripod or ball universal joints, the volume of the bellows being as small as possible while permitting large clearances with a minimum of wear of the protective element.

2. Description of the Prior Art

To avoid this difficulty, bulky universal joint covers are generally used on the side of the wheel, which requires the use of a large amounts of grease inside this type of bellows.

Another current practice resides in the use of bellows of smaller volume having folds whose walls form acute angles at rest. The drawback of this arrangement resides in the fact that the outer ends or tops of the folds come into contact when turning the wheels. Since these areas are in rotation in relation to one another, wear of the outer walls of the cover, as well as an embrittlement and possibly premature failure, result, with a consequential loss of the grease contents, and the risk of foreign bodies being admitted into the universal joints.

There can also occur an inner abrasion due to a contact of the inner ends or hollows of the folds on the sharp edges of the tripod, particularly in sharp turns. Thus, it appears that for each turn of the bellows, the folds are subjected to both a very closed angle of compression and a very open angle of expansion in the stretched part.

This contributes to imposing on the folds at each turn, a wide range of folding angles which goes from a completely closed angle in the compression zone to an almost flat angle in the spread zone.

It is therefore desirable, for increasing the life of the bellows, to reduce these large clearances and thereby limit the stresses at the tops and hollows of the folds.

SUMMARY OF THE INVENTION

This invention has as its object to avoid the above drawbacks by defining the particular shape of a bellows with a reduced and constant volume while avoiding the abrasion phenomenon of the folds mentioned above during steering locks with a high angular value.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
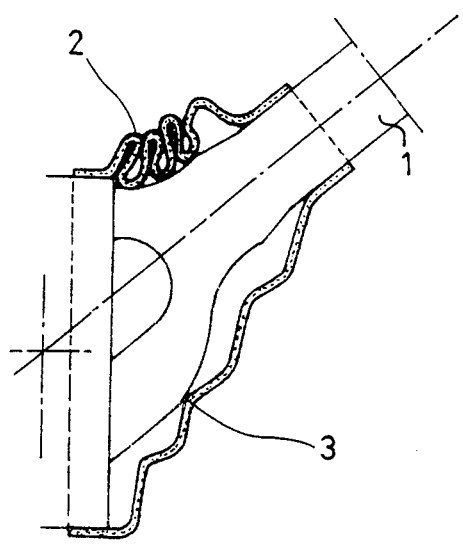
FIG. 1 is a view in section of a standard bellows with triangular folds for a large angle of lock.
Figure 2:
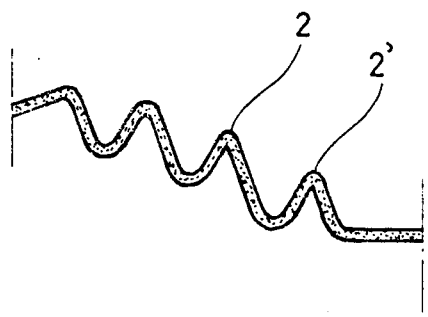
FIGS. 2 and 3 are a view in section, of the triangular section fold and the straight section fold, respectively, at rest.

FIG. 1 shows the state of a generally used bellows when the drive element 1 is locked at about 40°. The folds being of a standard structure, i.e., consisting of walls forming an acute angle between them at rest, as shown in FIG. 2, it is found that on one side the tops of the folds coming into contact with one another are subjected to a considerable pressure. On the opposite side, the hollows of inner ends 3 of the stretched part of the bellows, near the tripod zone of the drive, can also be subjected to a strong abrasion when they meet this very aggressive zone.

Figure 3:
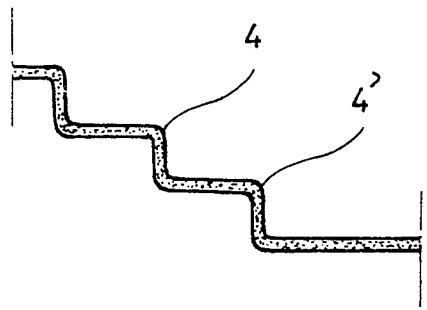

The arrangement of the ends of the folds among themselves, and particularly their separation, is therefore a determining factor of the life of the bellows. The comparison of the shapes of the walls according to FIGS. 2 and 3 shows that the separation of tops 2—2' of a structure with an acute angular section according to FIG. 2 is smaller than that for tops 4—4' of FIG. 3 with a structure of straight angle section.

From this finding and still maintaining the desire to give the bellows of the invention the smallest internal volume possible, the following criteria will be taken into consideration:

1. Use of at least two folds whose walls form angles near 90°.
2. Maximum separation of the tops of the folds.
3. Maximum reduction of the number of folds and minimal length of the bellows.
4. Adding of a projecting cylindrical zone for the attachment of the bellows, on the side opposite the drive connected to the wheel.

Figure 4:
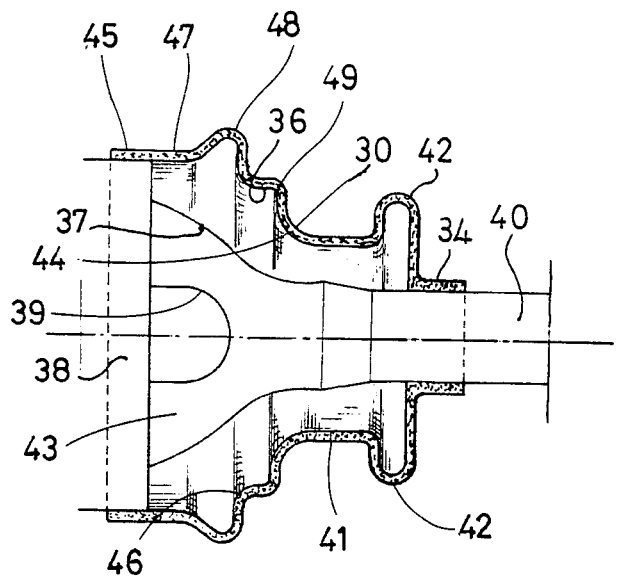
FIG. 4 is a view in section of a bellows according to the invention whose folds are at a right angle, in the rest position.

The bellows according to the invention conforms to what is illustrated, at rest, in FIG. 4.

The drive element to be covered comprises a shaft 40 connected by one of its ends to the right front drive wheel, not shown, and by opposite end of tripod 43, to an element with a larger diameter 38 placed upstream in relation to the motor.

The protective bellows has a cylindrical strip 45 located on the side of the large diameter element 38 of the drive. A large fold 48 having walls which form an angle of less than 90° and with a diameter slightly larger than that of the cylindrical strip 45 is positioned to the right of zone 45. An intermediate fold 49 is connected to a first cylindrical zone 41 by a curvature or hinge 30, connects to large fold 48 via a second cylindrical part 36, and connects to a small fold 42 that ends with a sleeve 34 with a small diameter surrounding shaft 40. Small fold 42 is intended to provide a complement to the other folds during stretching.

Cylindrical zone 41 is located the necessary distance between this small fold 42 and the two other folds 48 and 49 to prevent contact therebetween, and therefore the wear of these folds is reduced, in the maximum steering lock position of shaft 40.

The curvature 30 defining the connection of fold 49 with the first cylindrical zone 41, which plays the important role of a hinge; is the connection between small fold 42 and cylindrical zone 41 on one side, and the two other folds 48 and 49 extended by strip 45 of second cylindrical zone 45, on the other side. This hinge or curvature 30 is located approximately in the middle of the total length of the bellows. Its position is limited inwardly by the proximity of tripod 43 whose edges 37 can be frictionally engaged. For large angles of locking, point 44 of the bellows does not touch tripod 43 but is very close to it; it is therefore in a maximum limit position. Intermediate fold 49 and large fold 48, although very close to one another, have the tops sufficiently separated so that, even for the large angles of lock, they never touch one another.

Between the two folds 48 and 49 and coupling zone 45, the strip 45 of second cylindrical zone 47 has two major roles. The first is to separate curve 46 from tripod 43 because this point, for large angles of locking, tends to move inwardly toward the interior of the bellows. As a result of this separation, point 46 moves inwardly to the interior without touching the friction edges 37 of tripod 43; its second function is to provide for swinging of the folds 48 and 49 outward at the maximum angles of locking, rather than obtaining a tight packing of the folds at the interior of the bellows.

In general, a constant thickness is provided for the bellows material over its entire length; however, certain portions more exposed to wear than others can be reinforced.

By way of example, the following dimensional characteristics can be mentioned which have made it possible to obtain a particularly effective bellows according to the invention. A radius of curvature between 0.5 times and 5 times the thickness of the bellows is given to the folds. Large fold 48 has a diameter on the order of 0.9 to 1.1 times the total length of the bellows, while intermediate fold 49 and small fold 42 respectively have diameters from 0.7 times to 1 times this length and from 0.6 times to 0.8 times this length respectively. The first cylindrical zone 41 has diameters from 0.4 to 0.6 times this length and second cylindrical zone 47 has a value slightly greater than the diameter of intermediate fold 49.

As for the distance separating the edge of the second cylindrical zone 47 from the planes of symmetry of each of the folds of the bellows of the invention, preferable approximate lengths are 0.1 to 0.3 times that of the bellows for large fold 48, from 0.4 to 0.5 times for intermediate fold 49 and from 0.7 to 0.8 times for small fold 42.

It is desirable for the second cylindrical zone 47 to have a length in the neighborhood of two to fives times the average thickness of the bellows material.

Figure 5:
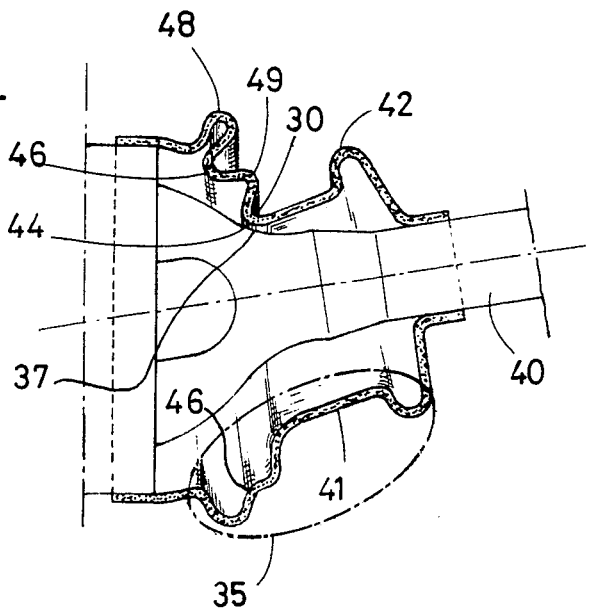
FIGS. 5 to 8 are views in section of the bellows according to the invention, respectively for angles of lock with values of 10°, 20°, 30° and 40°.

FIG. 5 shows the bellows for a 10° angle of locking of shaft 40. At this angle, shaft 40 generally revolves at high speed and good coaxial rigidity of the cylindrical part 41 in relation to shaft 40 is noted. The hinge point consisting of the curvature 30, and the group of inner folds 44 and 46 do not in any way touch the metal parts of the drive.

Figure 6:
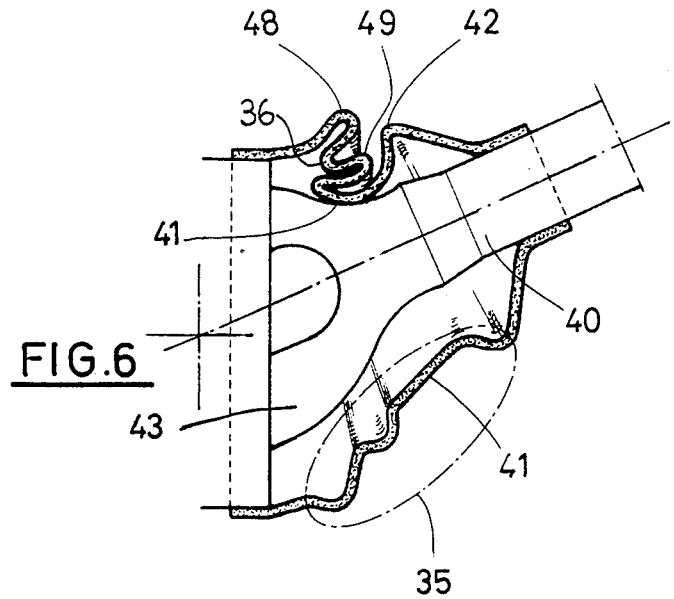

For an angle of inclination of shaft 40 with a value of 20°, as shown in FIG. 6, cylindrical zone 41 comes in contact with the smooth part of shaft 40, and intermediate fold 49 is housed between the two folds 48 and 42. None of the three folds 48, 49 and 42 touches the other. The opposite stretched part 35 of the bellows remains sufficiently separated from the tripod 43 to avoid contact therewith.

Figure 7:
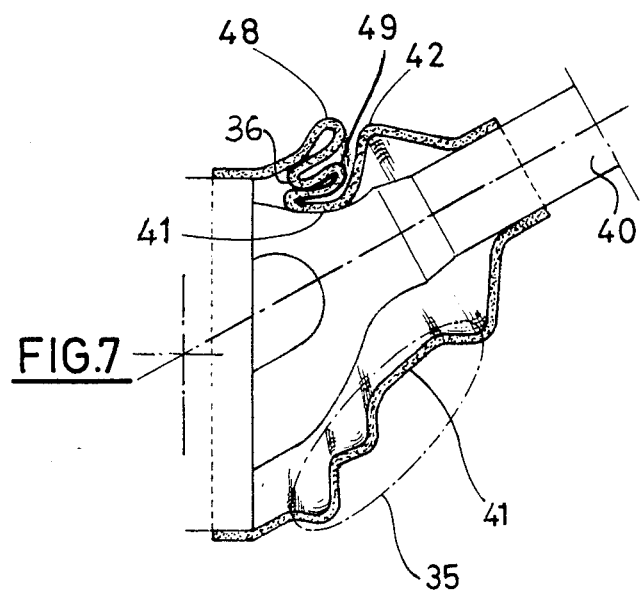

For an inclination of 30° (FIG. 7), folds 48, 49 and 42 overlap each other without touching. Intermediate fold 49 lays on cylindrical zone 41, itself resting against the smooth part of shaft 40. The two other folds 48 and 42, very close to one another, cover the unit consisting of fold 49 and cylindrical part 41. Stretched part 35 still remains sufficiently separated from the tripod to avoid contact therewith.

Figure 8:
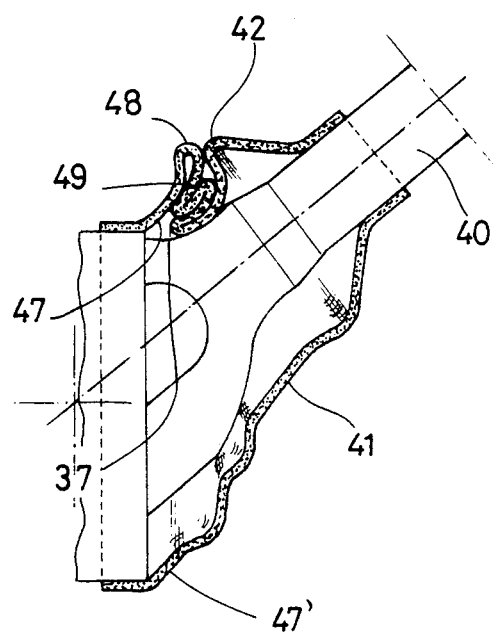

For an inclination of 40° (FIG. 8), small fold 42 comes into contact with large fold 48. At this angle of lock however, it must be noted that the rotational speeds are necessarily low.

A portion of cylindrical part 41, resting on shaft 40, and intermediate fold 49, slide under large fold 48 and push it outward. The three folds 48, 49 and 42 are thus free from any inner frictional engagement of the bellows caused by contact with the edge 37 of the tripod.

This outward swinging is assisted by second cylindrical zone 47 which acts as a hinge. The difference of diameter between intermediate fold 49 (FIG. 4) and the larger fold by cylindrical zone 47 makes it possible to obtain this movement while avoiding any locking of the inner face 36 of fold 49 on the inner face of zone 47. In stretched position, cylindrical zone 47 (FIG. 8) takes the direction of the angle that shaft 40 sets for it and prevents too great a stretching of the folds. On the side of the closed angle of the drive, the cylindrical zone 47 and fold 48 are moved outward and although there is contact between folds 42 and 48, the flexibility of this arrangement has the effect of considerably limiting any possible abrasion.

Figure 9:
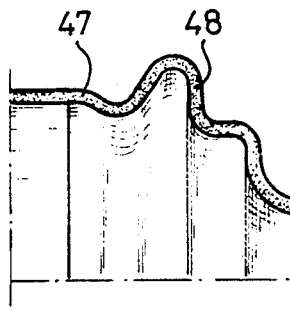
FIGS. 9, 10 and 11 are views in section of other variants of the strip in relation to the large fold and to the coupling zone.
Figure 10:
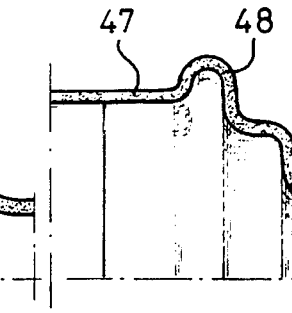
Figure 11:
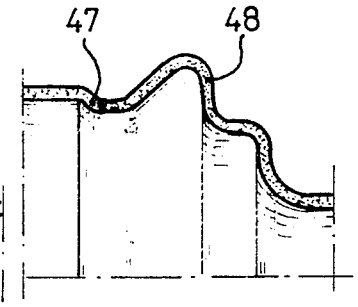
Figure 12:
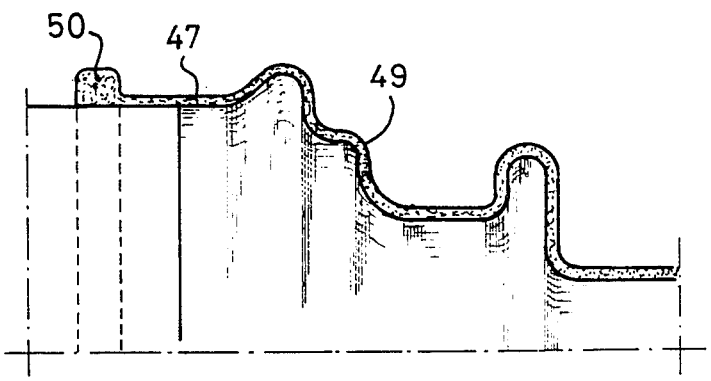
FIG. 12 is a view in section of a variant having a shockproof pad in the coupling zone.

The connection of large diameter fold 48 with cylindrical zone 47 can be made according to the variants illustrated in FIGS. 9, 10 and 11. Another variant consists of adding to the outer edge of zone 47, at the area of the attachment to element 38, a protective pad 50 (FIG. 12) intended to prevent any degradation of the bellows during a shock.

Figure 13:
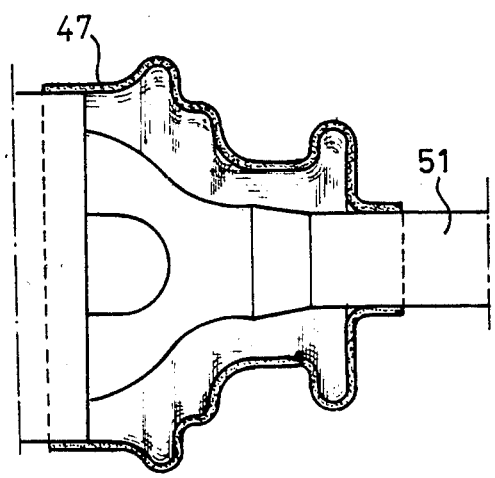
FIGS. 13 and 14 are views in section respectively showing the bellows over a solid shaft drive and over a tube drive.
Figure 14:
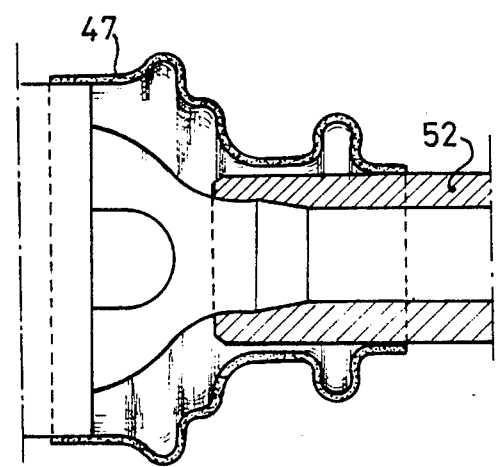
Figure 15:
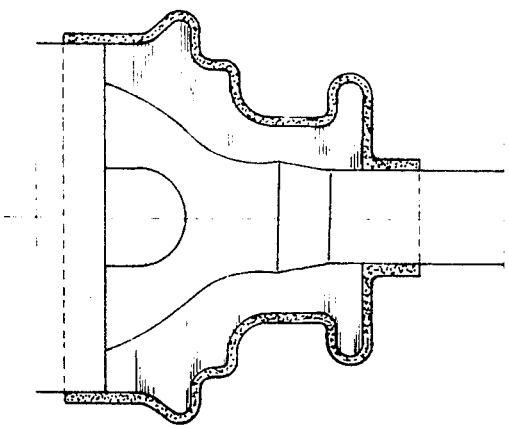
FIGS. 15 and 16 are views in section showing size variants of the bellows.
Figure 16:
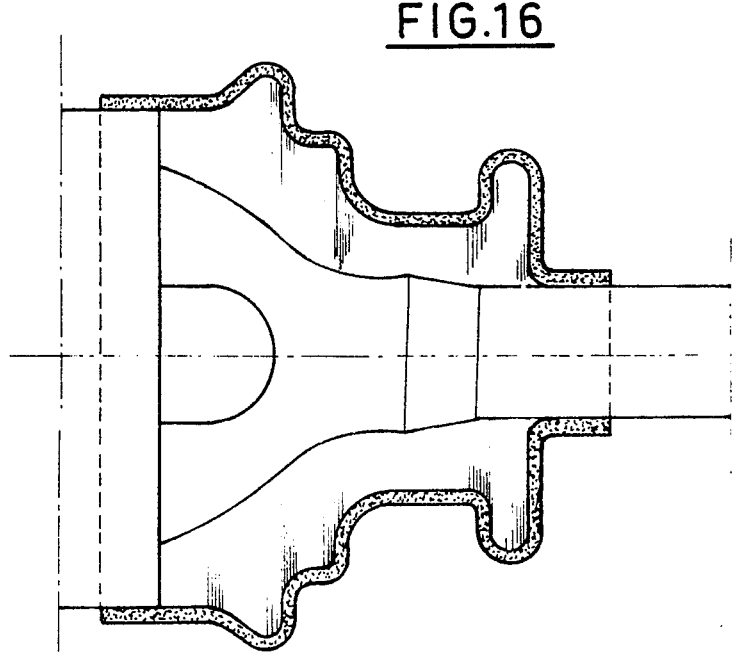

The device according to the invention can be adapted to a solid shaft 51 (FIG. 13) or tube shaft 52 (FIG. 14) drives. The optional modifications of the bellows corresponding to the use of one or the other of the above versions does not involve a notable change of its configuration nor of its operating principle. Consequently, taking into account this adaptation various various diameters, an application to various drives with more or less reduced dimensions is possible by a simple uniform enlargement or reduction in size of the bellows, as can be seen in FIGS. 15 and 16.

This invention can also be used for ball universal joints. In this case, the bellows, while remaining true to its operating principle, can be reduced in volume, all the easier since there is no clearance required for the tripod.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A protective bellows for a shaft having one end connected to a large diameter element via a connection permitting relative pivoting therebetween about two orthogonal axes, said bellows comprising an elastic annular member defining in order along the axis of said shaft towards said large diameter element:

a small diameter sleeve connected to said shaft;

a small diameter fold connected to said small diameter sleeve;

a first cylindrical zone connected to said small diameter fold and having a smaller diameter than said small diameter fold;

an intermediate diameter fold connected to said first cylindrical zone via a curvature;

a large diameter fold connected to said intermediate diameter fold wherein the walls of said large diameter fold form an angle of less than 90°; and a second cylindrical zone connected between said large diameter fold and said large diameter element wherein walls of said intermediate fold form at least a right angle between them, said walls of said intermediate fold being respectively joined to said large diameter fold and to said first cylindrical zone and wherein the diameter of said second cylindrical zone is greater than the diameter of said intermediate fold.

2. The bellows of claim 1 wherein the thickness of the material of the bellows is constant over at least a portion of the bellows length.

3. The bellows of claim 1 wherein the radius of curvature of said folds is between 0.5 times and 5 times the thickness of the material of the bellows.

4. The bellows of claim 1 wherein the diameter of said large fold has a value of 0.9 to 1.1 times the total length of the bellows.

5. The bellows of claim 1 wherein the diameter of said intermediate fold has a value of 0.7 to 1 times the total length of the bellows.

6. The bellows of claim 1 wherein the diameter of the small fold has a value of 0.6 to 0.8 times the total length of the bellows.

7. The bellows of claim 1 wherein the diameter of said first cylindrical zone is between 0.4 and 0.6 times the total length of said bellows.

8. The bellows of claim 1 wherein the length of said second cylindrical zone is two to fives times the average thickness of the material of said bellows.

9. The bellows of claim 1 wherein the plane of symmetry of each said fold is located at a distance from a nearest edge of said second cylindrical zone of 0.1 to 0.3 times the total length of said bellows for said large fold, 0.4 to 0.5 times said total length for said intermediate fold, and 0.7 to 0.8 times the said total length for said small fold.

* * * * *